United States Patent
Lee

(10) Patent No.: US 7,350,395 B2
(45) Date of Patent: Apr. 1, 2008

(54) APPARATUS FOR GENERATING ROAD SURFACE REACTION FORCE IN A TEST APPARATUS FOR STEER-BY-WIRE SYSTEM

(75) Inventor: Sang Ho Lee, Kunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/311,106

(22) Filed: Dec. 19, 2005

(65) Prior Publication Data

US 2006/0156803 A1 Jul. 20, 2006

(30) Foreign Application Priority Data

Dec. 20, 2004 (KR) ...................... 10-2004-0108727

(51) Int. Cl.
*G01M 17/06* (2006.01)
(52) U.S. Cl. ..................................... 73/11.07; 73/118.1
(58) Field of Classification Search ............... 73/11.04, 73/11.05, 11.07, 11.08, 11.09, 118.1, 121, 73/128, 129, 669, 670
See application file for complete search history.

(56) References Cited

U.S. PATENT DOCUMENTS 5,065,324 A * 11/1991 Oshita et al. ................. 701/41
5,700,951 A 12/1997 Sagiyama et al.
6,612,393 B2 * 9/2003 Bohner et al. ............... 180/405
7,040,026 B2 * 5/2006 Hirano et al. ............. 33/203.13
2002/0178594 A1 * 12/2002 Hirano et al. ............. 33/203.13

FOREIGN PATENT DOCUMENTS

| JP | 04-113907 | 4/1992 |
|---|---|---|
| JP | 04-232829 | 8/1992 |
| JP | 08-248873 | 9/1996 |
| JP | 2001-013865 | 1/2001 |
| JP | 2001-281110 | 10/2001 |
| JP | 2002-113420 | 4/2002 |
| JP | 2004-149067 | 5/2004 |

* cited by examiner

*Primary Examiner*—Eric S. McCall
(74) *Attorney, Agent, or Firm*—Morgan Lewis & Bockius LLP

(57) ABSTRACT

An apparatus for generating a road surface reaction force in a test apparatus for a steer-by-wire system includes a steering actuation unit, and actuators arranged in parallel to tie rods of the steering actuation unit. In accordance with this arrangement, there is an advantage of a reduced installation space. Also, it is possible to transmit the force of each actuator to the associated tie rod without loss, and thus, to accurately implement the generation of a road surface reaction force.

6 Claims, 2 Drawing Sheets

APPARATUS FOR GENERATING ROAD SURFACE REACTION FORCE IN A TEST APPARATUS FOR STEER-BY-WIRE SYSTEM

CROSS-REFERENCE TO RELATED APPLICATION

This application claims priority to and the benefit of Korean Patent Application No. 10-2004-0108727 filed in the Korean Intellectual Property Office on Dec. 20, 2004, the entire contents of which are incorporated herein by reference.

BACKGROUND OF THE INVENTION

1. Field of the Invention

The present invention relates to a test apparatus for a steer-by-wire system, and, more particularly, to an apparatus for generating a road surface reaction force in a test apparatus for a steer-by-wire system.

2. Description of the Related Art

Generally, a test apparatus for a steer-by-wire system tests whether or not a steering device in a vehicle operates normally, under a simulated operational condition of the vehicle.

Conventional road surface reaction generators require a large installation space, and have problems transmitting force between internal components. Furthermore, the design of certain components must be varied depending on the capacity of the test apparatus.

SUMMARY OF THE INVENTION

Embodiments of the present invention provide an apparatus for generating a road surface reaction force in a test apparatus for a steer-by-wire system which can more accurately transmit a road surface reaction force, and can minimize the installation space of the apparatus.

In an exemplary embodiment of the present invention, an apparatus for generating a road surface reaction force in a test apparatus for a steer-by-wire system comprises: a steering actuation unit which includes a tie rod, an actuator arranged in parallel to the tie rod of the steering actuation unit, a connector which connects the tie rod of the steering actuation unit to the actuator, and a slider which linearly moves the connector in a forward or rearward direction in accordance with operation of the actuator.

The slider may include a first slider coupled to the connector at a side of the actuator, and a second slider coupled to the connector at a side of the steering actuation unit.

The first slider may include a first sliding member mounted to one side of the connector, and a first guide rail adapted to guide a movement of the first slider.

The second slider may include a second sliding member mounted to the other side of the connector, and a second guide rail adapted to guide a movement of the second slider.

The actuator and the steering actuation unit may be vertically spaced apart from each other by a certain distance.

The actuator may be mounted on a base plate which functions as a base of the apparatus. The steering actuation unit may be mounted on a table fixed to the base plate while being upwardly spaced apart from the base plate.

The first and second guide rails may be mounted to a single guide block fixed to the base plate.

The apparatus may further comprise a load cell arranged between the actuator and the connector to measure a force transmitted from the actuator.

The apparatus may further comprise a linear variable differential transformer (LVDT) sensor connected to the actuator to measure a movement of the actuator.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Now, exemplary embodiments of the present invention will be described in detail with reference to the annexed drawings.

Figure 1:
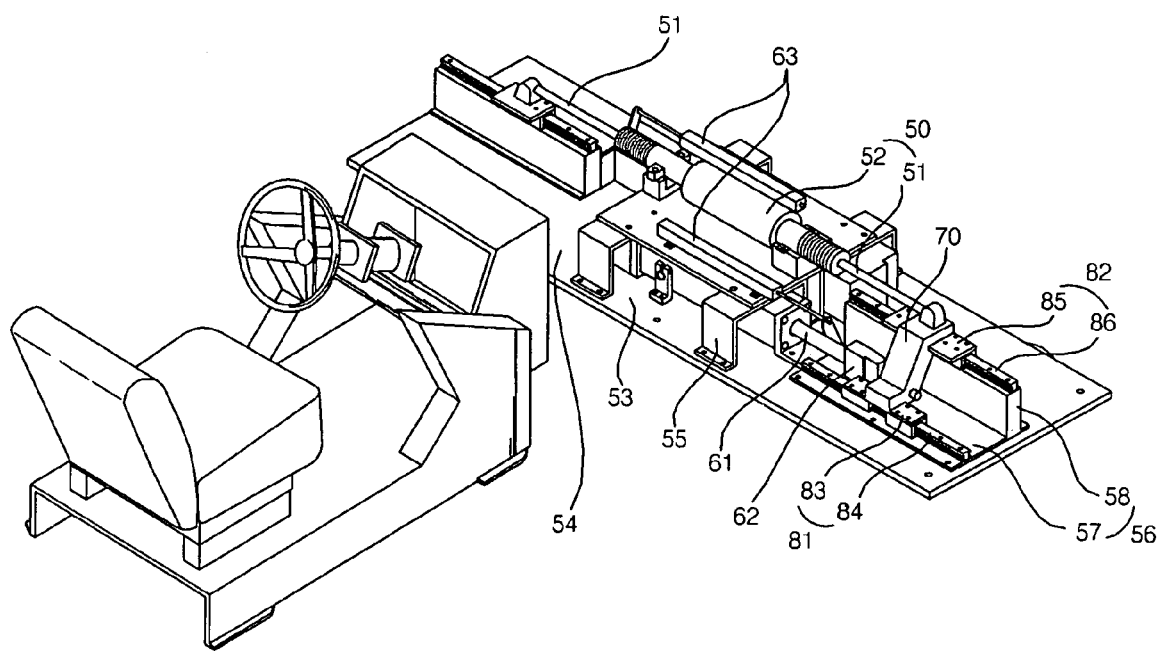
FIG. 1 is a perspective view illustrating a test apparatus for a steer-by-wire system in which a road surface reaction force generating apparatus according to an exemplary embodiment of the present invention is applied.
Figure 2:
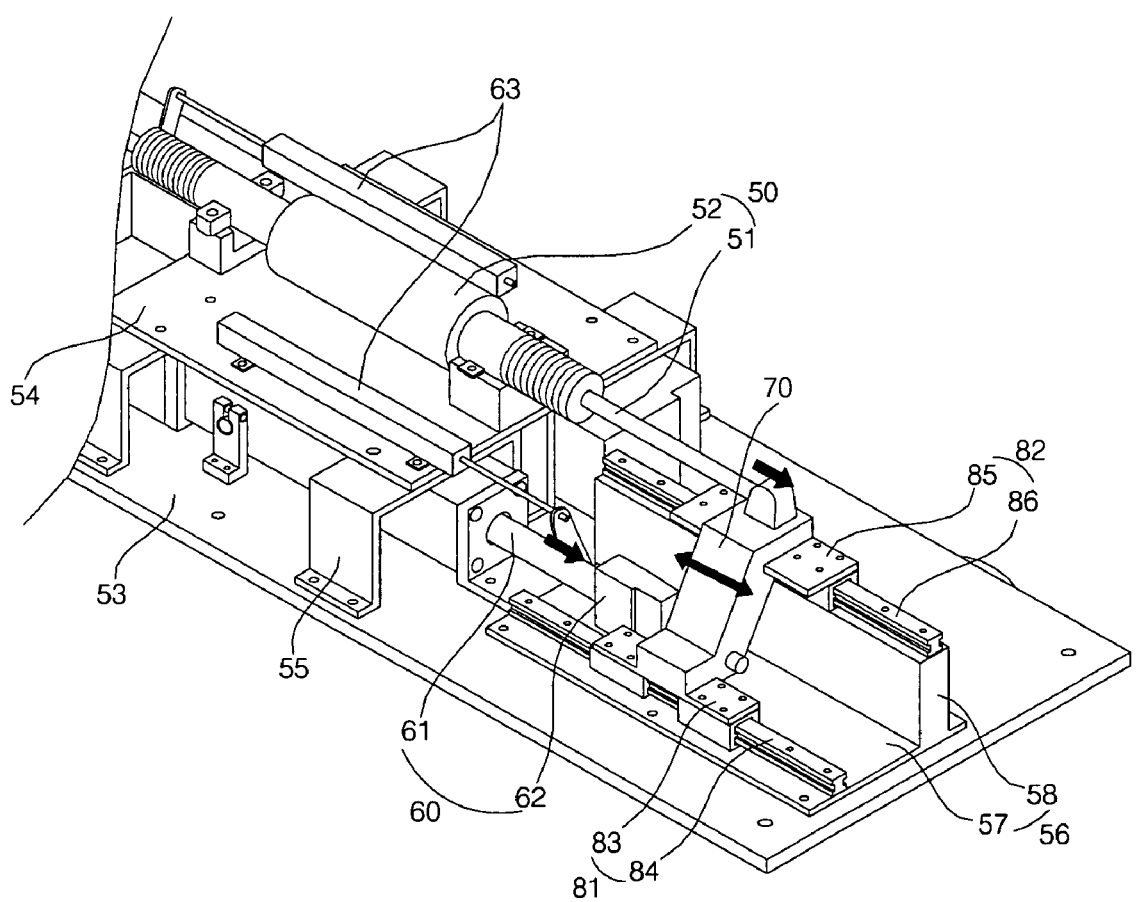
FIG. 2 is an enlarged perspective view illustrating a road surface reaction force generating apparatus according to an exemplary embodiment of the present invention.

As shown in FIGS. 1 and 2, a road surface reaction force generating apparatus includes a steering actuation unit 50 which includes tie rods 51, actuators 60, arranged in parallel to the tie rods 51 of the steering actuation unit 50. Connectors 70 each connect one of the tie rods 51 of the steering input unit 50 and a respective one of the actuators 60. Sliders each linearly move an associated one of the connectors 70 in forward and rearward directions in accordance with operation of the associated actuator 60.

The steering actuation unit 50 includes a gear box 52 which includes a rack (not shown) arranged in the gear box 52. The tie rods 51 of the steering actuation unit 50 are connected to opposite ends of the rack. The steering actuation unit 50 also includes a motor (not shown) which drives the rack.

The steering actuation unit 50 and each actuator 60 are arranged such that they are vertically spaced apart from each other by a certain distance. Each actuator 60 is mounted on a base plate 53, whereas the steering actuation unit 50 is mounted on a table 54 attached to the base plate 53 and upwardly spaced apart from the base plate 53.

The table 54 is attached to the base plate 53 on each side by a mounting bracket 55.

The actuators 60 are opposite each other, in order to reproduce road surface reaction forces respectively generated from left and right wheels of a vehicle to which the road surface reaction force generating apparatus is applied.

Rod 61 protrudes from the actuators 60 in opposite directions, such that the rods 61 extend in parallel to the tie rods 51 of the steering actuation unit 50.

Each connector 70 has a bent structure to accommodate the level difference between the associated actuator 60 and the steering actuation unit 50. The connector 70 is connected, at a lower end thereof, to the rod 61 of the associated actuator 60, and is connected, at an upper end thereof, to the associated tie rod 51 of the steering actuation unit 50.

The slider includes first sliders 81 each coupled to the associated connector 70 at the side of the associated actuator 60. Second sliders 82 are coupled to the associated connector 70 at the side of the steering actuation unit 50.

Each first slider 81 includes a first sliding member 83 mounted to a lower end of the associated connector 70, and a first guide rail 84, which guides movement of the first slider 83. Each second slider 82 includes a second sliding member 85 mounted to an upper end of the associated connector 70, and a second guide rail 86, which guides movement of the second slider 85.

Guide blocks 56 are attached to an upper surface of the base plate 53, in order to support the first and second guide rails 84 and 86. Each guide block 56 includes a horizontal plate portion 57 attached to the upper surface of the base plate 53, and a vertical plate portion 58 protruding from the horizontal plate portion 57. Each first guide rail 84 and each second guide rail 86 are mounted to the horizontal and vertical plate portions 57 and 58 of the associated guide block 56, respectively.

A load cell 62 is arranged between the rod 61 of each actuator 60 and the associated connector 70, to measure a force transmitted from the actuator 60.

A linear variable differential transformer (LVDT) sensor 63 is also provided to measure movement of each actuator 60. The LVDT sensor 63 is mounted to a top surface of the table 54, and is connected to the rod 61 of the associated actuator 60 by a bracket. The mounting portions of the load cells 62 and LVDT sensors 63 are made of an engineering plastic material.

Hereinafter, operation of the road surface reaction force generating apparatus having the above-described configuration according to the present invention will be described. For simplicity of description, the following description will be given only in conjunction with the configuration arranged at one side of road surface reaction force generating apparatus.

When the actuator 60 is operated under the control of an electronic control unit (not shown), the rod 61 of the actuator 60 is linearly moved in a forward or rearward direction.

The electronic control unit may comprise a processor, memory, and associated hardware, software, and/or firmware as may be selected and programmed by a person of ordinary skill in the art based on the teachings of the present invention.

In accordance with the linear movement of the rod 61 of the actuator 60, the connector 70 slides while being guided by the first and second sliders 83 and 85.

Accordingly, the tie rod 51 of the steering actuation unit 50 connected to the upper end of the connector 70 is linearly moved in the forward or rearward direction. That is, the tie rod 51 is pushed or pulled. The force applied to the tie rod 51 functions as a virtual road surface reaction force that is transmitted from the road surface to actuate the gear box 52 of the steering actuation unit 50.

The movement direction of the rod 61 of the actuator 60 and the movement direction of the tie rod 51 of the steering actuation unit 50 are identical, so that loss of force during transmission of the force is minimized.

Also, since the connector 70 slides while being guided by the first and second sliders 81 and 82, loss of force caused by friction is prevented. In addition, since the rod 61 of the actuator 60, the connector 70, and the tie rod 51 of the steering actuation unit 50 are configured such that they move in the same direction, and application of force is carried out in an axial direction, the load applied to each element is reduced. Accordingly, even when the capacity of the actuator 60 increases, it is unnecessary to vary the design of the elements that transmit force.

As is apparent from the above description, the road surface reaction force generating apparatus according to embodiments of the present invention, which is applied to a tester for a steer-by-wire system, has a reduced installation space because the tie rods of the steering actuation unit are arranged in parallel to the rods of the actuators. Also, it is possible to accurately implement the generation of a road surface reaction force because the force of each actuator can be transmitted to the associated tie rod without losses.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating a road surface reaction force in a test apparatus for a steer-by-wire system, comprising:
   a steering actuation unit comprising a tie rod;
   an actuator arranged in parallel to the tie rod of the steering actuation unit;
   a connector which connects the tie rod of the steering actuation unit to the actuator;
   a first sliding member, which linearly moves the connector in a forward or rearward direction in accordance with an operation of the actuator, coupled to the connector at a first side;
   a second sliding member, which linearly moves the connector in the forward or rearward direction in accordance with the operation of the actuator, coupled to the connector at a second side;
   a first guide rail that guides a movement of the first slider; and
   a second guide rail that guides a movement of the second slider;
   wherein the first and second guide rails are substantially parallel, such that the movements of the first and second sliders are substantially parallel.

2. The apparatus according to claim 1, wherein the actuator and the steering actuation unit are vertically spaced apart.

3. The apparatus according to claim 1, further comprising a load cell, between the actuator and the connector, which measures a force transmitted from the actuator.

4. The apparatus according to claim 1, further comprising a linear variable differential transformer sensor, connected to the actuator, which measures a movement of the actuator.

5. The apparatus according to claim 1, wherein:
   the actuator is mounted on a base plate; and
   the steering actuation unit is mounted on a table attached to the base plate and upwardly spaced apart from the base plate.

6. The apparatus according to claim 5, wherein the first guide rail and the second guide rail are mounted to a guide block attached to the base plate.

* * * * *